(12) United States Patent
Yamaguchi et al.

(10) Patent No.: US 11,388,853 B2
(45) Date of Patent: Jul. 19, 2022

(54) WORK VEHICLE

(71) Applicant: KUBOTA CORPORATION, Osaka (JP)

(72) Inventors: Tetsuo Yamaguchi, Osaka (JP); Yoshihiko Kuroshita, Osaka (JP); Hitoshi Azuma, Osaka (JP); Michita Kono, Osaka (JP); Shinji Ohara, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 661 days.

(21) Appl. No.: 16/415,167

(22) Filed: May 17, 2019

(65) Prior Publication Data
US 2019/0350121 A1 Nov. 21, 2019

(30) Foreign Application Priority Data
May 18, 2018 (JP) .............................. JP2018-096566

(51) Int. Cl.
| | |
|---|---|
| *A01B 71/02* | (2006.01) |
| *A01B 76/00* | (2006.01) |
| *B60K 23/00* | (2006.01) |
| *B60K 25/06* | (2006.01) |
| *F16H 61/00* | (2006.01) |

(52) U.S. Cl.
CPC .............. *A01B 71/02* (2013.01); *A01B 76/00* (2013.01); *B60K 23/00* (2013.01); *B60K 25/06* (2013.01); *F16H 61/00* (2013.01)

(58) Field of Classification Search
CPC ................. F16H 61/08; F16H 61/0437; F16H 2061/0444; F16H 61/00; B60Y 2200/221; B60K 23/00; A01B 76/00
See application file for complete search history.

(56) References Cited

U.S. PATENT DOCUMENTS

| | | | | |
|---|---|---|---|---|
| 5,816,100 A | * | 10/1998 | Fowler | ................ F16H 61/0248 74/335 |
| 2003/0226416 A1 | * | 12/2003 | Umemoto | ......... B60W 30/1819 74/335 |

(Continued)

FOREIGN PATENT DOCUMENTS

JP 2016-125603 7/2016

*Primary Examiner* — Mussa A Shaawat
(74) *Attorney, Agent, or Firm* — Greenblum & Bernstein, P.L.C.

(57) ABSTRACT

A vehicle includes; a vehicle body on which the motor is mounted; an apparatus provided to the traveling vehicle body and also driven by drive power from the motor; an apparatus that performs work on a field; an apparatus that changes the speed of drive power input from the motor and transmits the drive power; a tool that includes speed change stages and is also capable of speed change operation of the speed change apparatus by human operation; a controller that, when the number of speed change stages is changed based on human operation of the speed change operation tool, outputs to the speed change apparatus a speed change command for each predefined number of stages and is also capable of outputting the speed change command for each defined speed change interval; and an operation mechanism that enables adjustment of the speed change interval.

20 Claims, 9 Drawing Sheets

(56) References Cited

U.S. PATENT DOCUMENTS

| | | | |
|---|---|---|---|
| 2008/0103664 A1* | 5/2008 | Hata | F16H 61/0213 |
| | | | 701/55 |
| 2009/0029826 A1* | 1/2009 | Eguchi | G05G 5/24 |
| | | | 477/39 |
| 2013/0030667 A1* | 1/2013 | Fujimoto | B60W 30/143 |
| | | | 701/93 |
| 2013/0110360 A1* | 5/2013 | Saito | F16H 61/0213 |
| | | | 701/51 |
| 2013/0172147 A1* | 7/2013 | Razaznejad | B60W 10/11 |
| 2016/0031443 A1* | 2/2016 | Komatsu | B60W 30/143 |
| | | | 701/93 |
| 2016/0033038 A1* | 2/2016 | Kobayashi | B60K 37/06 |
| | | | 701/64 |
| 2016/0040394 A1* | 2/2016 | Monden | B60K 6/387 |
| | | | 903/902 |
| 2017/0198768 A1* | 7/2017 | Vora | B60K 25/02 |

\* cited by examiner

WORK VEHICLE

CROSS-REFERENCE TO RELATED APPLICATIONS

The present application claims priority under 35 U.S.C. § 119 of Japanese Application No. 2018-096566, filed on May 18, 2018, the disclosure of which is expressly incorporated by reference herein in its entirety.

BACKGROUND OF THE INVENTION

1. Field of the Invention

The present invention relates to a work vehicle provided with a travel apparatus that is driven by the drive power of a motor, a work apparatus that performs work on a farm field, and a speed change apparatus which receives an input of the drive power of the motor, changes the speed of the input drive power, and transmits the drive power to at least one of the travel apparatus and the work apparatus.

2. Description of Related Art

For example, Japanese Patent Laid-open Publication No. 2016-125603 discloses a work vehicle in which drive power of a motor (engine (4)) is input to travel apparatuses (front wheels (2) and rear wheels (3)), and a work apparatus (connected device (7) in the reference) that performs work on a farm field, wherein the speed of the drive power of the motor (engine (4)) is changed after being input to a speed change apparatus (speed change device (5), main speed change device (16), and high/low speed change device (17) in the reference), and the drive power is transmitted to the travel apparatuses (front wheels (2) and rear wheels (3)) and the work apparatus (connected device (7) in the reference). When a primary speed change clutch or the like is provided to the speed change apparatus of Japanese Patent Laid-open Publication No. 2016-125603 and a speed change command is executed, a hydraulic fluid fill time is defined before initiating a pressurization action of the primary speed change clutch and the pressurization action of the primary speed change clutch is executed after the hydraulic fluid fill time is completed, for example. With this configuration, a shock that occurs when performing a speed change is mitigated.

With the configuration according to Japanese Patent Laid-open Publication No. 2016-125603, the shock of speed change is mitigated, and a change in the number of revolutions of the motor can be more readily controlled. However, there are also cases where controlling the number of revolutions of the motor can become difficult when successively executing speed change commands across many stages, and there are risks that the rotation speed of the motor may be insufficient and the motor may stall, or that the motor may start to over-rotate. In particular, when using a tractor or the like where the number of speed change stages tends to be large, the number of speed change stages based on human operation tends to become larger and the load on the motor accompanying the speed changes tends to become larger.

SUMMARY OF THE INVENTION

In view of the circumstances described above, an advantage of the present invention provides a work vehicle that, by appropriately adjusting and controlling the timing of speed change control, alleviates a shock that may occur during a speed change by circumventing stalling of a motor caused by a speed increase in a speed change apparatus and also circumventing over-rotation of the motor caused by a speed decrease in the speed change apparatus, even when a number of speed change stages is changed to a large number of stages based on a human operation.

A work vehicle according to the present invention includes a rotationally driven motor; a traveling vehicle body on which the motor is mounted; a travel apparatus that is provided to the traveling vehicle body and is also driven by drive power from the motor; a drive apparatus that is capable of driving a work apparatus that performs work on a farm field; a speed change apparatus that receives an input of the drive power of the motor, changes the speed of the input drive power, and transmits the drive power to at least one of the travel apparatus and the work apparatus; a speed change operation tool that includes a plurality of speed change stages and is also capable of speed change operation of the speed change apparatus by way of a human operation; a speed change controller that, when the number of speed change stages is changed over a plurality of stages based on human operation of the speed change operation tool, outputs to the speed change apparatus a speed change command for each predefined number of stages and is also capable of outputting the speed change command for each defined speed change interval; and an operation mechanism that enables adjustment of the speed change interval.

According to the present invention, even when a speed change operation of the speed change apparatus resulting from human operation spans many stages, the speed change controller does not output the speed change command to the speed change apparatus all at once, but rather executes the speed change command by breaking the command into a plurality of cycles of a predefined number of stages each so as to reach the changed number of speed change stages, which has been changed across many stages. Therefore, the load applied to the motor and the shock of speed change can be alleviated as compared to a configuration where the speed change controller executes the speed change command all at once. Also, the speed change controller has a configuration which outputs the plurality of speed change commands at every defined speed change interval. Therefore, even when the rotation speed of the motor drops when the speed of the speed change apparatus increases, for example, the speed change controller can grant the time necessary for the rotation speed of the motor to recover to the rotation speed that preceded the speed change command. With this configuration, a work vehicle can be achieved that, by appropriately adjusting and controlling the timing of speed change control, alleviates a shock that may occur during a speed change by circumventing stalling of the motor caused by a speed increase in the speed change apparatus and also circumventing over-rotation of the motor caused by a speed decrease in the speed change apparatus, even when a number of speed change stages is changed to a large number of stages based on a human operation.

In the present invention, the speed change interval is preferably configured by a time interval.

According to this configuration, the speed change interval is a time interval, and therefore an amount of time necessary to restore the rotation speed of the motor to the rotation speed that preceded the speed change command can be readily ensured.

In the present invention, the time interval is preferably an interval following completion of the speed change of the speed change apparatus based on the speed change command, and prior to output of the next speed change command.

A speed change shock may occur during speed change of the speed change apparatus. According to the present configuration, following completion of the speed change of the speed change apparatus—that is, after the rotation speed of the motor drops—the next speed change command is output after the time interval elapses. Therefore, the amount of time needed for restoring the rotation speed of the motor can be readily ensured, and the shock caused by a speed change accompanying the next speed change command can be alleviated.

In the present invention, the speed change interval is preferably configured by a distance interval.

With this configuration, also, the amount of time necessary to restore the rotation speed of the motor to the rotation speed that preceded the speed change command can be readily ensured, and the shock that may occur during a speed change can be alleviated by circumventing stalling of the motor caused by a speed increase in the speed change apparatus and also circumventing over-rotation of the motor caused by a speed decrease in the speed change apparatus.

In the present invention, the speed change interval can be configured as either the time interval or the distance interval, and the operation mechanism is preferably configured so as to enable selection of the time interval or the distance interval.

With this configuration, a worker can freely adjust the speed change interval simply by operating the operation mechanism to match the state of a farm field or the worker's preferences.

In the present invention, the operation mechanism is preferably configured to enable the speed change interval to be adjusted by at least one of modifying the value of the speed change interval and modifying a set number of stages associated with the speed change interval.

By modifying the value of the speed change interval, the worker can fine-tune the speed change interval using specific numerical values. Also, even when the worker is not familiar with adjusting the numerical value of the speed change interval, with the present configuration, the worker can intuitively modify the speed change interval by modifying the set number of stages. In other words, this configuration allows the operation mechanism to be switched in accordance with the worker's degree of familiarity with operation.

The present invention preferably includes a speed change interval definer that can automatically define the speed change interval.

In addition to adjusting the speed change interval with the operation mechanism, when the present invention has a configuration that allows the speed change interval to be automatically defined, the worker can adjust the speed change interval based on the automatically defined speed change interval, and a baseline for judgment can be obtained that allows the worker to adjust the speed change interval.

The present invention preferably includes a load detector that is capable of detecting a load applied to the motor, and an allowable load defining mechanism that is capable of defining an allowable range for the load using a human operation, and in a case where the load is outside the allowable range, the speed change controller preferably outputs the speed change command at each speed change interval.

In a case where no load is applied to the motor, when the speed change controller completes a single cycle of speed change for the speed change apparatus, the speed change controller preferably outputs the next speed change command without waiting the speed change interval. According to this configuration, the present invention can detect the load on the motor using the load detector, and therefore the speed change controller can output the speed change command at each speed change interval exclusively in cases where a large load is applied to the motor. Also, the allowable range of the load can be defined by a human operation, and therefore the worker can more readily adjust the tempo of the speed change commands.

In the present invention, the load is preferably at least one of a load factor of the motor and a towing load that the work apparatus applies to the traveling vehicle body.

The degree of the load applied to the motor can be judged by calculating the load factor based on the rotation speed of the motor and on how open the accelerator that controls the output of the motor is, for example. In addition, the degree of the load applied to the motor can also be judged by detecting the towing load of the work vehicle towing the work apparatus, for example. According to this configuration, these methods can be used in combination, for example, and a load detector that is capable of detecting the load applied to the motor can be achieved.

The present invention preferably includes a load selecting mechanism that is capable of selecting either one of the load factor and the towing load as the load by way of a human operation.

The present configuration enables the worker to select various kinds of load detectors in response to the state of the farm field, for example.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Configuration of Tractor According to Present Invention

Figure 1:
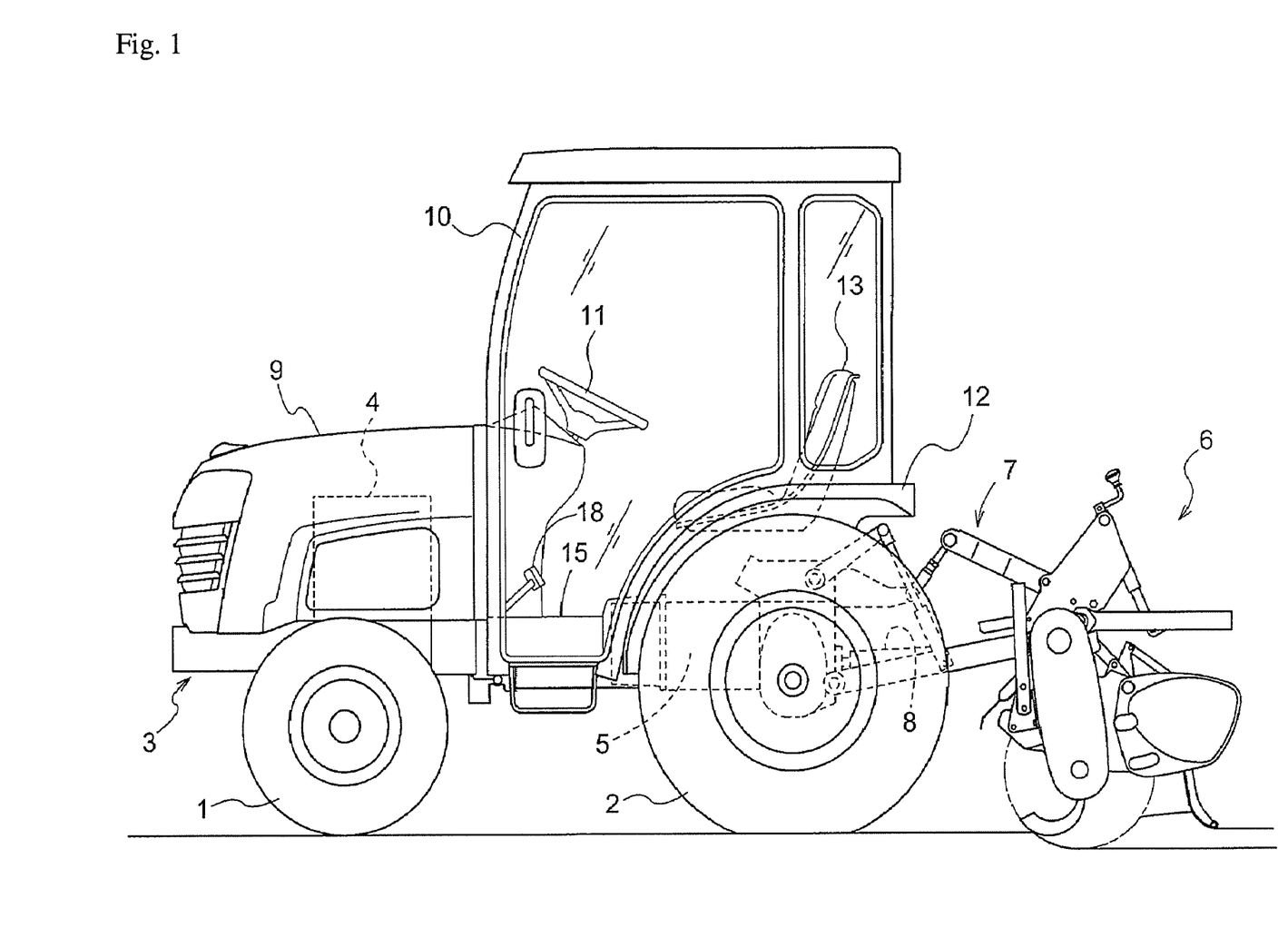
FIG. 1 is an overall side view of a tractor.

An embodiment of the present invention is described below with reference to the drawings. A tractor according to the present invention is illustrated in FIG. 1. A vehicle body 3 (traveling vehicle body) is supported by front wheels 1 and rear wheels 2 (travel apparatuses), an engine 4 (motor) that is rotationally driven is mounted in a front portion of the vehicle body 3, and a transmission 5 is mounted rearward of the engine 4. Rearward of the vehicle body 3, a rotary tiller 6 is equipped as an exemplary work apparatus that performs work on a farm field. The rotary tiller 6 is provided so as to be vertically movable via a link mechanism 7. The tractor is a four-wheel-drive vehicle in which drive power of the engine 4 is transmitted to the front wheels 1 and the rear wheels 2 via a speed change mechanism that is built into the transmission 5. Moreover, the drive power of the engine 4 is also transmitted to the rotary tiller 6 via a PTO shaft 8 (drive apparatus according to the present invention), which projects rearward from the transmission 5. Specifically, the PTO shaft 8 (drive apparatus) is configured to be capable of driving the rotary tiller 6 (work apparatus). The engine 4 is covered by a hood 9. A cabin 10 is supported on the vehicle body 3 at a location to the rear of the hood 9 and above the transmission 5. An interior of the cabin 10 serves as a driver space. A steering handle 11 that steers the front wheels 1 is provided at a front portion of the driver space, and a driver seat 13 is arranged at a rear portion thereof, the driver seat 13 being positioned between a left-right pair of rear wheel fenders 12.

Figure 2:
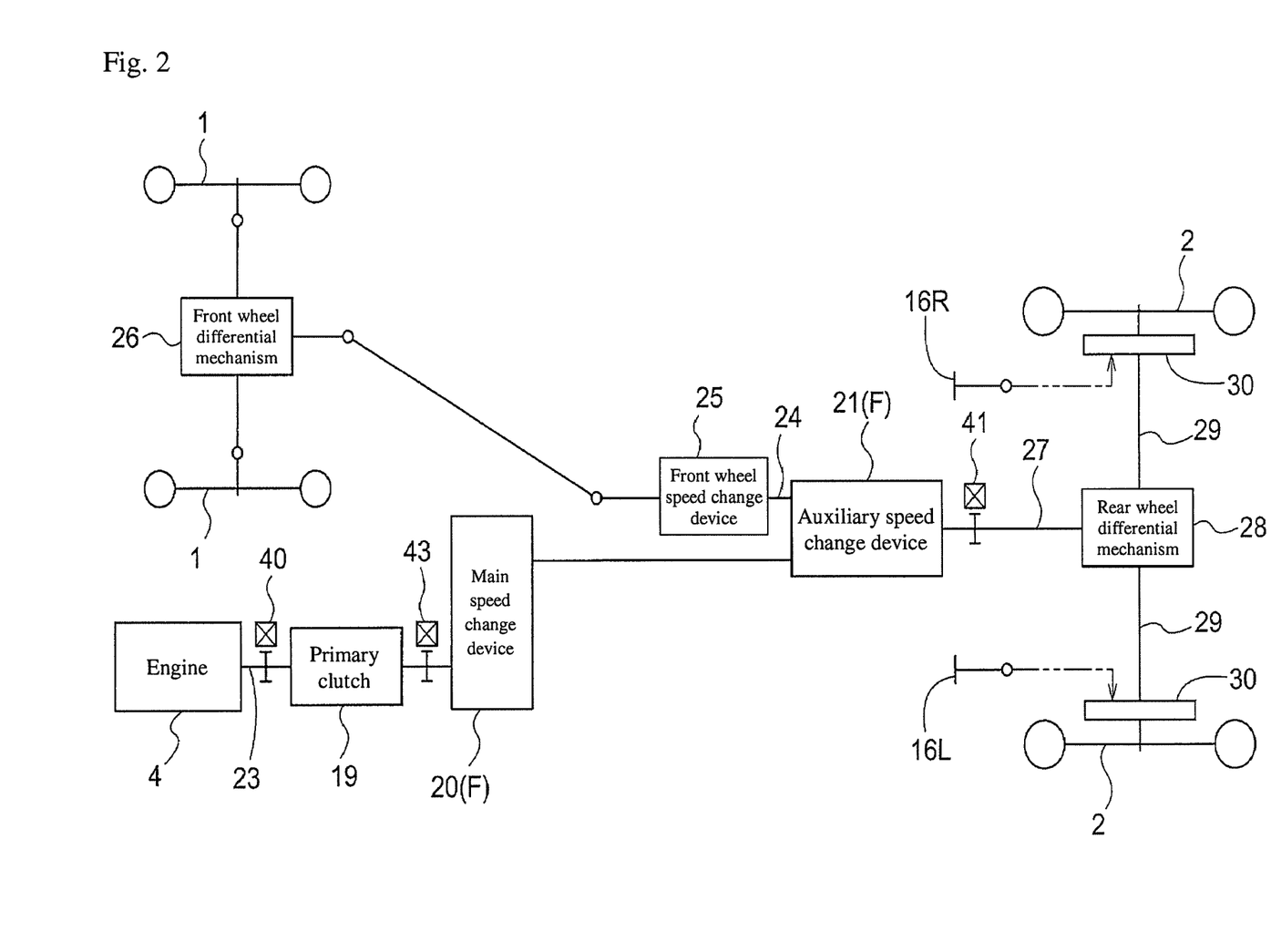
FIG. 2 is a diagram of a transmission system of the tractor.

As illustrated in FIG. 2, a gear-type main speed change device 20 (speed change apparatus according to the present invention) and a gear-type auxiliary speed change device 21 are provided as a speed change mechanism that changes the speed of the drive power from the engine 4, which is transmitted via a primary clutch 19. The main speed change device 20 is configured so as to be capable of switching between a plurality of speed change stages (for example, eight stages) with no accompanying interruption in the transmission of drive power, while the auxiliary speed change device 21 is configured so as to be capable of switching between a plurality of speed change stages (for example, four stages) accompanied by an interruption in the transmission of drive power.

The drive power that has undergone a speed change and that is output from a front wheel output shaft 24 of the auxiliary speed change device 21 is transmitted to the left and right front wheels 1 as a front wheel driving force via a front wheel speed change device 25 and a front wheel differential mechanism 26, for example. The drive power that has undergone a speed change and that is output from a rear wheel output shaft 27 of the auxiliary speed change device 21 is transmitted to the left and right rear wheels 2 as a rear wheel driving force via a rear wheel differential mechanism 28 and left and right rear wheel axles 29, for example. Accordingly, the tractor is configured as a four-wheel-drive model that drives the left and right front wheels 1 and rear wheels 2.

Although not discussed in detail, the main speed change device 20 and the auxiliary speed change device 21 are each provided with, for example, an actuator for speed change control such as an oil hydraulic cylinder or an electric cylinder, and are configured to be capable of speed change control by controlling the operation of the actuators.

A left/right pair of brake pedals 16R and 16L are provided to a cockpit floor 15, and the brake pedals 16R and 16L are provided so as to be capable of independently performing a braking operation on left and right braking devices 30 that are provided to the pair of rear axles 29. In addition, the left/right pair of brake pedals 16R and 16L are pivotably supported on the vehicle body 3 so as to enable independent step depression operation.

Figure 3:
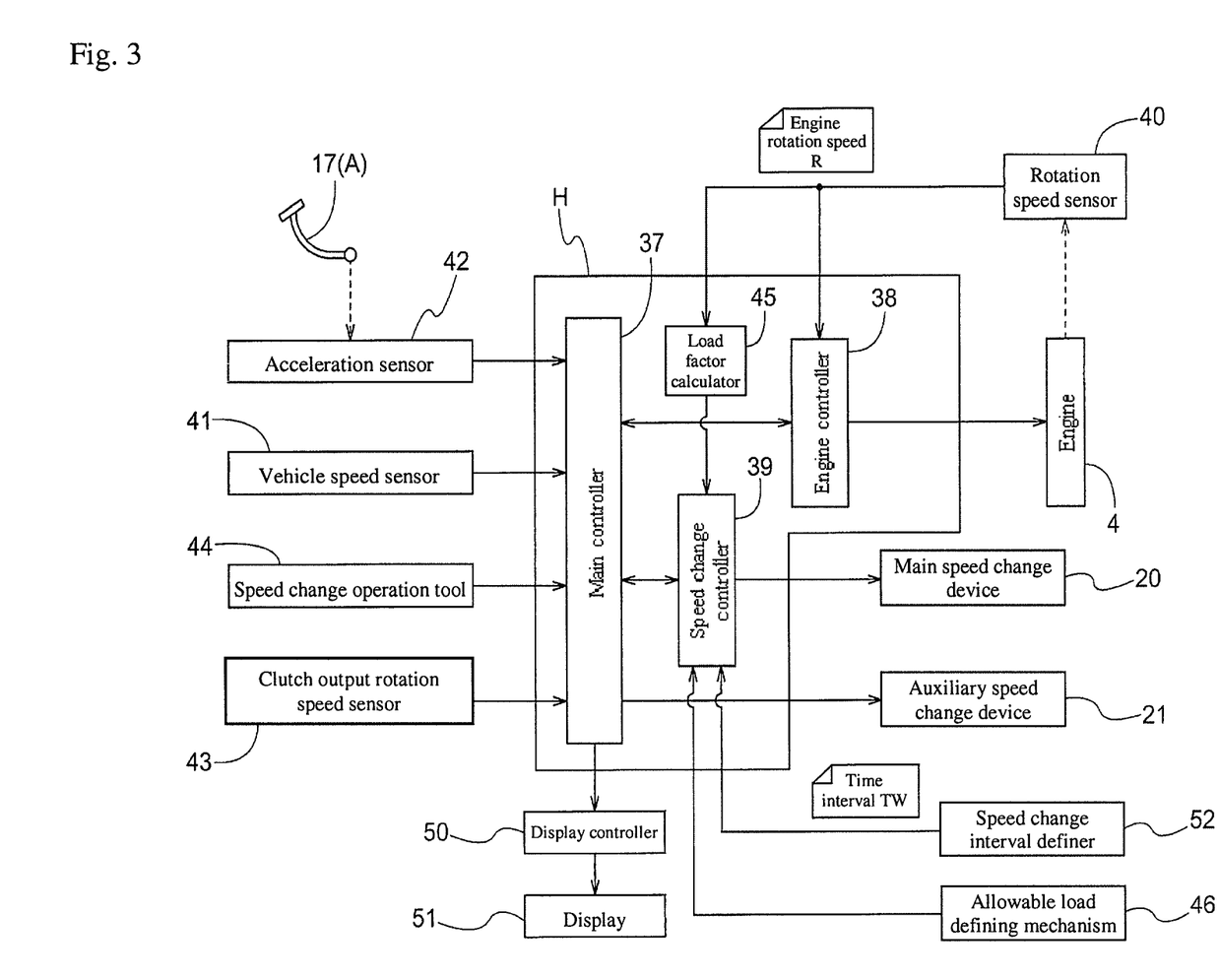
FIG. 3 is a block diagram of controls in the tractor.

As illustrated in FIG. 3, a travel control mechanism H is, for example, a module installed on a micro-computer that is mounted on the vehicle body. The travel control mechanism H is provided with a main controller 37, an engine controller 38, and a speed change controller 39. The main controller 37 sets a target rotation speed of the engine 4 in accordance with an operation position of an accelerator pedal 17, controls a speed change status of the main speed change device 20 and the auxiliary speed change device 21, and so on. The engine controller 38 controls operations of the engine 4 based on settings information that is set by the main controller 37. Discussed in detail below, the speed change controller 39 outputs a speed change command to the main speed change device 20 based on human operation of a speed change operation tool 44, based on a speed change interval setter 52, and based on an allowable load defining mechanism 46. The allowable load defining mechanism 46 has a configuration capable of defining, with a human operation, an allowable range upper limit Lu and an allowable range lower limit Ld (illustrated in FIGS. 4 to 6).

The main controller 37 outputs various kinds of information to a display controller 50, and information selected by the display controller 50 from among the various kinds of information is displayed on a display 51. In the present embodiment, the display 51 is a touch screen liquid crystal display installed in an interior of the cabin 10.

As illustrated in FIGS. 2 and 3, the tractor according to the present invention includes a rotation speed sensor 40, a vehicle speed sensor 41, a potentiometer-style acceleration sensor 42, and a clutch output rotation speed sensor 43. The rotation speed sensor 40 detects an engine rotation speed R of the output shaft 23 of the engine 4. The vehicle speed sensor 41 detects the rotation speed of the rear wheel output shaft 27 in the auxiliary speed change device 21 and thereby detects the vehicle speed of the vehicle body 3. The acceleration sensor 42 detects the operation position of the accelerator pedal 17. The clutch output rotation speed sensor 43 detects the output rotation speed of the primary clutch 19.

The speed change operation tool 44 (see FIG. 3), which issues commands for the speed change status of the main speed change device 20 and the auxiliary speed change device 21, is provided in the vicinity of the driver's seat 13. Although not shown in the drawings, the speed change operation tool 44 includes a plurality of speed change stages, and is provided with a plurality of operation switches formed in various styles, such as a push-button style, slider style, dial style, or lever style.

Detection information for each of the acceleration sensor 42, the vehicle speed sensor 41, the clutch output rotation speed sensor 43, and the speed change operation tool 44 is input to the main controller 37. The main controller 37 finds a target rotation speed based on the detection information for the acceleration sensor 42. Also, the engine controller 38 is configured such that, when a command for the target rotation speed set by the main controller 37 is received, the engine controller 38 controls the engine rotation speed R by controlling an amount of fuel that is injected or the timing of the fuel injection based on the detection information for the rotation speed sensor 40. In addition, in the present embodiment, a load factor calculator 45 (a load factor detector according to the present invention) is provided that calculates a load factor L (a load according to the present invention), and the load factor calculator 45 is configured so as to be capable of judging the load factor L based on a degree to which the engine rotation speed R deviates from the target rotation speed of the engine 4.

To add to the discussion, the main controller 37 has a relationship between the target rotation speed and the operation position of the accelerator pedal 17 defined ahead of time by a map or the like. Using this map or the like, the target rotation speed of the engine 4 may be calculated in accordance with the operation position of the accelerator pedal 17.

Configuration of Speed Change Controller 39

When the number of defined speed change stages is defined and changes over a plurality of stages due to human operation of the speed change operation tool 44, the speed change controller 39 does not output a speed change command to the main speed change device 20 to change speed from the original speed change stage through to the new speed change stage all at once, but rather the modification due to human operation of the speed change operation tool 44 is received as a scheduled speed change and the speed change controller 39 outputs the speed change command by breaking the change down into a plurality of cycles of one stage each. When the speed change command for one cycle is received from the speed change controller 39, the speed of the main speed change device 20 is changed by only one stage. The primary clutch 19 is adjacent to the main speed change device 20, and at this time, the rotation speed sensor 40 detects a number of rotations on the side of the primary clutch 19 that receives input from the engine 4, and the clutch output rotation speed sensor 43 detects the number of rotations on the side of the primary clutch 19 that provides output to the main speed change device 20. When the speed of the main speed change device 20 is changed, a difference arises between the rotation speeds of the input side and the output side of the primary clutch 19, and when this difference in rotation speeds is detected as falling within a predefined range, the primary clutch 19 is judged to be in a synchronized state. Then, the speed change of the main speed change device 20 is judged to be completed due to the synchronization of the primary clutch 19, the speed change controller 39 outputs the next speed change command, and once again the speed of the main speed change device 20 is changed by only one stage. Specifically, until the number of speed change stages reaches the defined number of speed change stages, the speed change controller 39 successively outputs one speed change command at a time while judging whether the speed change of the main speed change device 20 is completed based on the synchronization of the primary clutch 19.

However, in a case where the vehicle body 3 is heavy or where towing the rotary tiller 6 in a work state is burdensome, when the speed of the main speed change device 20 is increased by only one stage, there is a risk that the engine rotation speed R may drop greatly. In such a case, even when the primary clutch 19 reaches a synchronized state, recovery of the engine rotation speed R tends to be slow. In addition, the next speed increase command from the speed change controller 39 is output while the engine rotation speed R has still not recovered, and when the speed of the main speed change device 20 is increased by a further one stage, there is a risk that the engine rotation speed R may drop further and the engine 4 may stall. Also, when the speed of the main speed change device 20 is decreased by only one stage in a state where the vehicle body 3 is heavy or where towing the rotary tiller 6 is burdensome, the engine rotation speed R increases. Even in such a case, the next speed decrease command from the speed change controller 39 is output while the engine rotation speed R is still high, and when the speed of the main speed change device 20 is decreased by a further one stage, there is a risk that the engine rotation speed R may increase further and the engine 4 may go into an over-rotation state. Moreover, when the speed of the main speed change device 20 is changed in a state where the rotation of the engine 4 is insufficient or in a state of over-rotation, the internal pressure of the primary clutch 19 rises and a shock of a speed change grows larger. In order to resolve these disadvantages, a time interval TW is defined as a speed change interval between post-completion of one speed change cycle and pre-initiation of the next speed change command. Discussed in detail below, the time interval TW is defined by a speed change interval definer 52. The speed change interval definer 52 is configured so as to be capable of defining the time interval TW with a human operation, but may also be configured so as to be capable of defining the time interval TW automatically.

Figure 4:
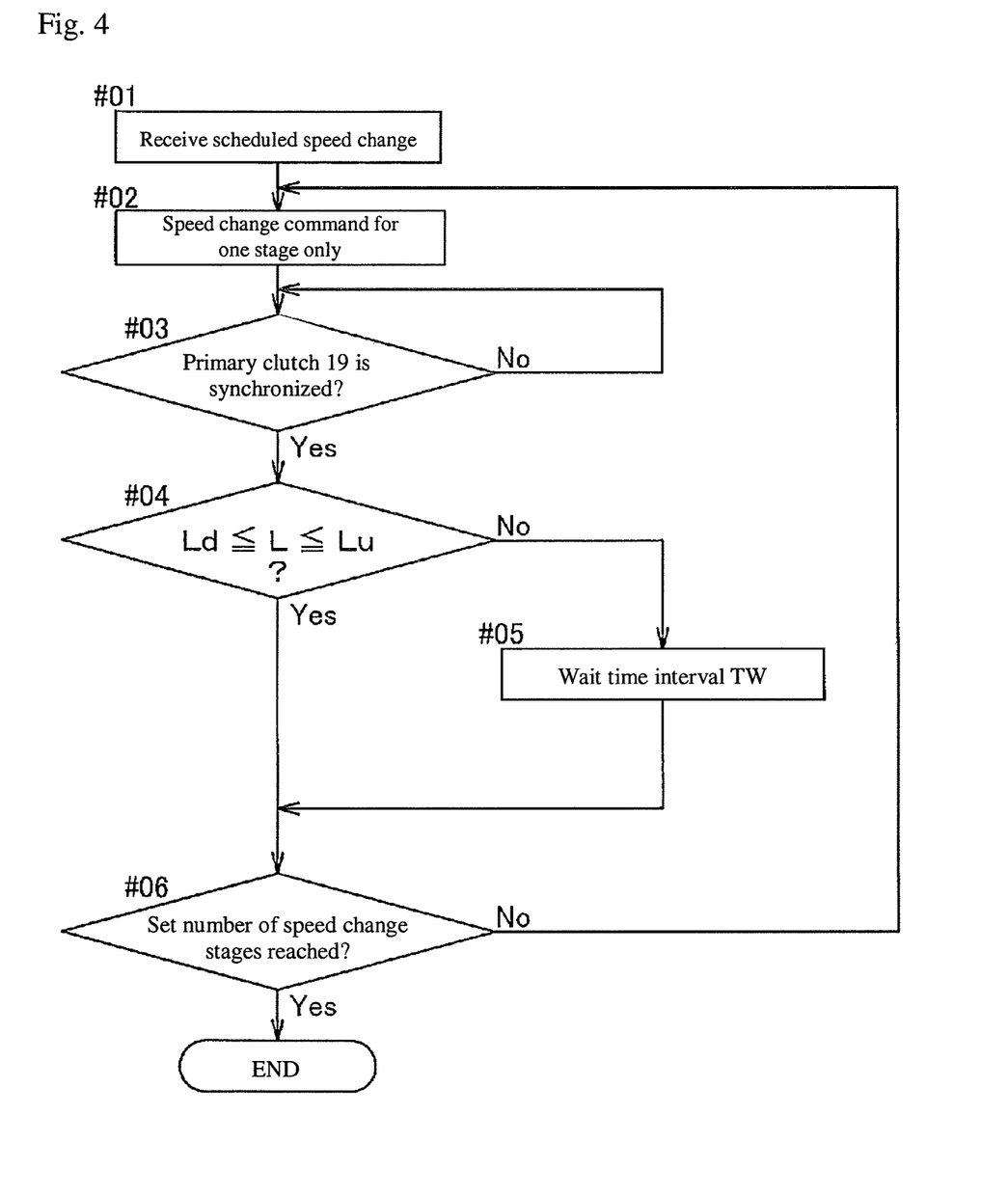
FIG. 4 is a flow chart illustrating a procedural flow of a speed change controller.
Figure 5:
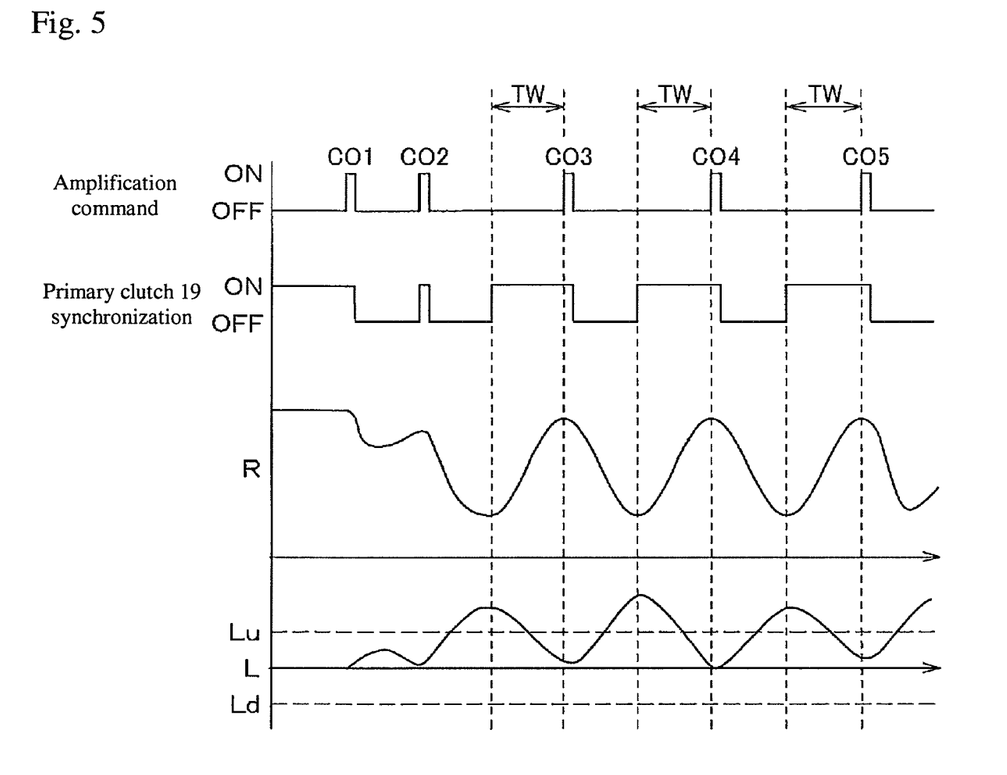
FIG. 5 is a graph illustrating a logic graph for a case where the speed change controller increases the speed of a main speed change device.
Figure 6:
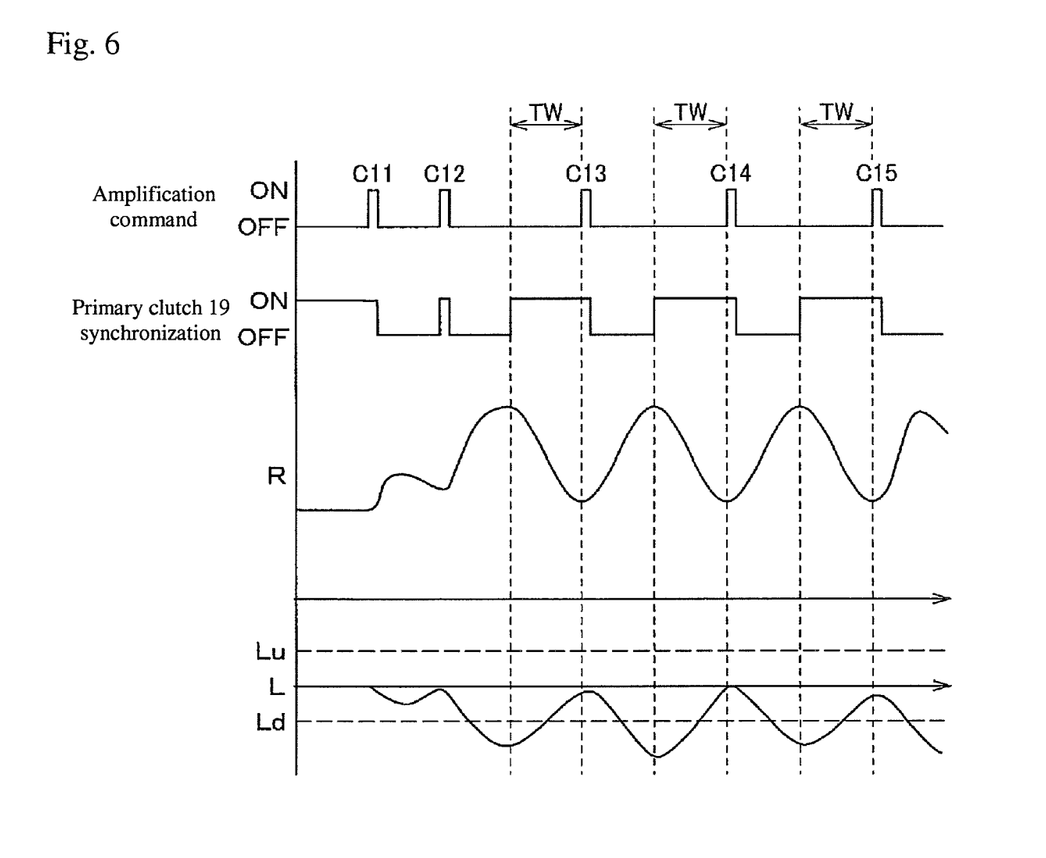
FIG. 6 is a graph illustrating a logic graph for a case where the speed change controller decreases the speed of the main speed change device.

As illustrated in FIG. 4, when a change made to the speed change operation tool 44 by a human operation is received by the speed change controller 39 as a scheduled speed change (step #01), the speed change controller 39 outputs the speed change command to the main speed change device 20 (step #02). When the speed is changed by the main speed change device 20, a difference arises between the rotation speeds of the input side and the output side of the primary clutch 19, and therefore the process stands by until the primary clutch 19 is judged to be in a synchronized state (step #03). When the primary clutch 19 is judged to be in a synchronized state (step #03: Yes), a determination is made as to whether the load factor L is within an allowable range (step #04). In the present embodiment, and as illustrated in FIGS. 5 and 6, the allowable range upper limit Lu and the allowable range lower limit Ld are defined as the allowable range for the load factor L based on the setting of the allowable load defining mechanism 46, and when the load factor L is within the range between the allowable range upper limit Lu and the allowable range lower limit Ld, the load factor L is judged to be within the allowable range. When the load factor L is within the allowable range (step #04: Yes), the process of the speed change controller 39 moves to step #06, described below. When the load factor L is outside the allowable range (step #04: No), the speed change controller 39 does not immediately move to the next speed change command and waits the time interval TW (step #05). The time interval TW is an interval following completion of the speed change of the main speed change device 20 resulting from the speed change command of the speed change controller 39, and prior to output of the next speed change command. When the time interval TW has elapsed, a determination is made as to whether the number of speed change stages of the main speed change device 20 has reached the defined number of speed change stages received with the scheduled speed change (step #06). When the defined number of speed change stages is reached (step #06: Yes), the speed change command is completed. When the defined number of speed change stages is not reached (step #06: No), the process is repeated beginning at step #02.

FIG. 5 illustrates a change over time for a signal output of the speed change command, the synchronization state of the primary clutch 19, the engine rotation speed R, and the load factor L in a case where the speed change controller 39 increases the speed of the main speed change device 20. In FIG. 5, the speed change command issued by the speed change controller 39 is illustrated as speed increase commands C01 to C05. When the initial speed increase command C01 is executed, the speed of the main speed change device 20 is increased by one stage. At this point, a difference arises between the rotation speeds of the input side and the output side of the primary clutch 19, and the synchronization state of the primary clutch 19 turns to OFF. In addition, the speed reduction ratio of the main speed change device 20 is reduced by the speed increase of the main speed change device 20, and therefore a load is applied to the engine 4 and the engine rotation speed R drops below the target rotation speed of the engine 4, and the load factor L is calculated as being on a rising side. In the speed increase of the main speed change device 20 resulting from the initial speed increase command C01, the load factor L does not exceed the allowable range upper limit Lu. Therefore, when the synchronization state of the primary clutch 19 is restored to ON, the speed change of the main speed change device 20 is judged to be complete, the next speed increase command C02 is promptly executed, and the speed of the main speed change device 20 is increased a further one stage.

In the speed increase of the main speed change device 20 resulting from the speed increase command C02, as well, a difference arises between the rotation speeds of the input side and the output side of the primary clutch 19, and the synchronization state of the primary clutch 19 turns to OFF. In addition, the speed reduction ratio of the main speed change device 20 is further reduced by the additional speed increase of the main speed change device 20, and therefore a load is applied to the engine 4 and the engine rotation speed R drops below the target rotation speed of the engine 4, and the load factor L is calculated as being on the rising side. FIG. 5 shows a situation where, when the speed of the main speed change device 20 increases due to the speed increase command C02, the engine rotation speed R drops more greatly than with the speed increase command C01, and the load factor L rises to exceed the allowable range upper limit Lu. Because of this, in order to circumvent stalling of the engine 4, even when the synchronization state of the primary clutch 19 is restored to ON, the speed change controller 39 does not immediately move to the next speed increase command and waits the time interval TW, as illustrated by step #05 in FIG. 4. During the time interval TW, the engine rotation speed R recovers so as to approach the target rotation speed of the engine 4. In addition, after the time interval TW elapses, the next speed increase command C03 is executed and the speed of the main speed change device 20 is further increased by one stage. Furthermore, even with the later speed increase commands C04 and C05, the speed increase commands C04 and C05 are each executed after the time interval TW elapses, based on the load factor L being outside the allowable range.

FIG. 6 illustrates a change over time for a signal output of the speed change command, the synchronization state of the primary clutch 19, the engine rotation speed R, and the load factor L in a case where the speed change controller 39 decreases the speed of the main speed change device 20. In FIG. 6, the speed change command issued by the speed change controller 39 is illustrated as speed decrease commands C11 to C15. When the initial speed decrease command C11 is executed, the speed of the main speed change device 20 is decreased by one stage only. At this point also, a difference arises between the rotation speeds of the input side and the output side of the primary clutch 19, and the synchronization state of the primary clutch 19 turns to OFF. In addition, the speed reduction ratio of the main speed change device 20 is increased by the speed reduction of the main speed change device 20, and therefore the engine 4 is revolves on a higher rotation side due to the main speed change device 20. Therefore, the engine rotation speed R rises above the target rotation speed of the engine 4, and the load factor L is calculated as being on a falling side. With the speed decrease of the main speed change device 20 resulting from the initial speed decrease command C11, the load factor L does not fall below the allowable range lower limit Ld. Therefore, when the synchronization state of the primary clutch 19 is restored to ON, the next speed decrease command C12 is promptly executed, and the speed of the main speed change device 20 is decreased a further one stage.

In the speed decrease of the main speed change device 20 resulting from the speed decrease command C12, as well, a difference arises between the rotation speeds of the input side and the output side of the primary clutch 19, and the synchronization state of the primary clutch 19 turns to OFF. In addition, similar to a case where the speed of the main speed change device 20 is reduced by the speed decrease command C11, the engine rotation speed R rises above the target rotation speed of the engine 4, and the load factor L is calculated as being on the falling side. FIG. 6 shows a situation where, when the speed of the main speed change device 20 decreases due to the speed decrease command C12, the engine rotation speed R increases more greatly than with the speed decrease command C11, and the load factor L drops below the allowable range lower limit Ld. Because of this, in order to circumvent over-rotation of the engine 4, even when the synchronization state of the primary clutch 19 is restored to ON, the speed change controller 39 does not immediately move to the next speed decrease command and waits the time interval TW, as illustrated by step #05 in FIG. 4. During the time interval TW, the engine rotation speed R is reduced so as to approach the target rotation speed of the engine 4. In addition, after the time interval TW elapses, the next speed decrease command C13 is executed and the speed of the main speed change device 20 is further decreased by one stage. Furthermore, even with the later speed decrease commands C14 and C15, the speed decrease commands C14 and C15 are each executed after the time interval TW elapses, based on the load factor L being outside the allowable range.

In this way, when the load factor L is outside the allowable range, the speed change controller 39 waits the time interval TW and executes the next speed change command. Accordingly, stalling of the engine 4 resulting from a speed increase in the main speed change device 20 is circumvented, and over-rotation of the engine 4 resulting from a speed decrease in the main speed change device 20 is circumvented. Also, with this configuration, the difference in rotation speeds between the input side and the output side of the primary clutch 19 does not become excessively large, and therefore the shock that may occur during speed change is alleviated.

Defining the Time Interval TW

Figure 7:
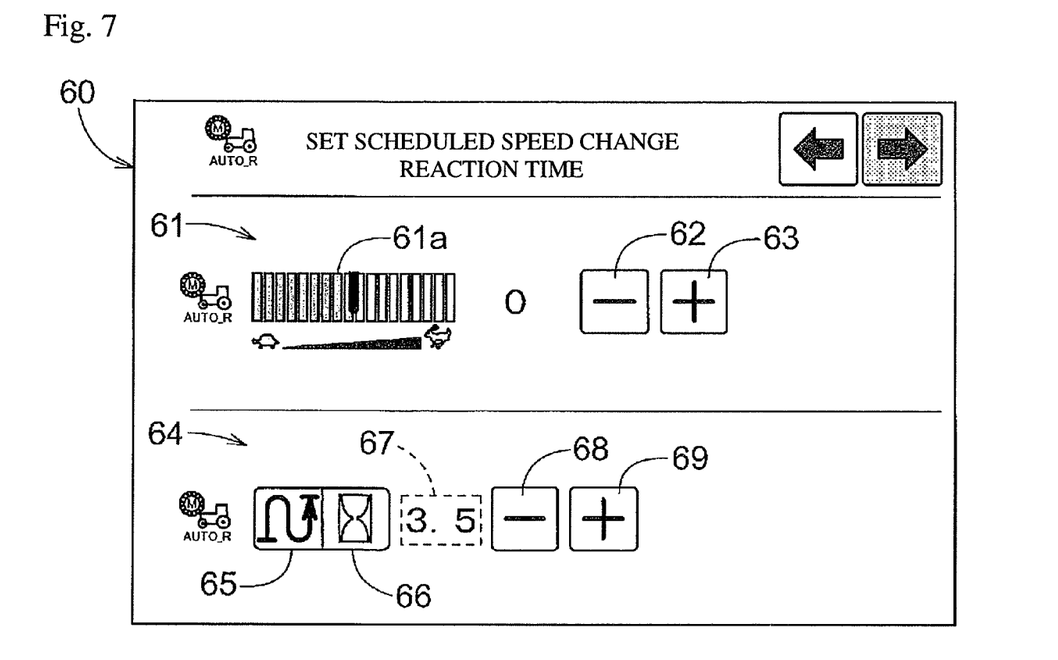
FIG. 7 is an explanatory diagram illustrating an operation mechanism.

In the present embodiment, the time interval TW is defined by human operation of the display 51. As noted above, the display 51 is a touch screen liquid crystal display. As illustrated in FIG. 7, a settings screen 60 (operation mechanism) is displayed on the display 51 for defining the time interval TW. The time interval TW is configured so as to enable being defined by each of a number of stages definer 61 positioned above a vertical direction center of the settings screen 60, and a numerical value definer 64 positioned below the vertical direction center of the settings screen 60.

The number of stages setter 61 is configured such that a set number of stages 61a that is associated with the time interval TW is displayed on the number of stages setter 61, and is also configured so as to enable the set number of stages 61a to be increased and decreased by a worker operating either one of a reducing switch 62 and an increasing switch 63. By operating the reducing switch 62, the numerical value of the set number of stages 61a becomes smaller, and the time interval TW is defined in an increasing direction. By operating the increasing switch 64, the numerical value of the set number of stages 61a becomes larger, and the time interval TW is defined in a decreasing direction. Specifically, the larger the numerical value of the set number of stages 61a becomes, the more relaxed the speed change sensitivity of the main speed change device 20 becomes, whereas the smaller the numerical value of the set number of stages 61a becomes, the sharper the speed change sensitivity of the main speed change device 20 becomes. With this configuration, the worker can intuitively adjust the speed change sensitivity of the main speed change device 20 without inputting a specific numerical value for the time interval TW. At this point, the speed change interval definer 52 defines the time interval TW based on the numerical value of the set number of stages 61a, the target rotation speed of the engine 4, and the load factor L calculated by the load factor calculator 45, and outputs the time interval TW to the speed change controller 39.

A distance setting switch 65 (described in more detail in the other embodiments), a time setting switch 66, a numerical value display 67, a reducing switch 68, and an increasing switch 69 are displayed on the numerical value definer 64. The number of stages definer 61 is configured such that the time interval TW is displayed on the numerical value display 67 by operating the time setting switch 66, and is configured so as to be capable of increasing and decreasing the time interval TW by the worker operating either one of the reducing switch 62 and the increasing switch 63. Specifically, the worker can define a specific numerical value for the time interval TW by operating either one of the reducing switch 62 and the increasing switch 63. In addition, the time interval TW is defined by the speed change interval definer 52 without modification, based on operation by the worker, and the time interval TW is output to the speed change controller 39.

In this way, the settings screen 60 is configured to enable the time interval TW (speed change interval) to be adjusted by modifying the value of the time interval TW and by modifying the set number of stages 61a associated with the time interval TW.

Other Embodiments

The present invention is not limited to the configurations exemplified in the embodiment described above. Hereafter, other exemplary embodiments are described which are representative of the present invention.

Figure 8:
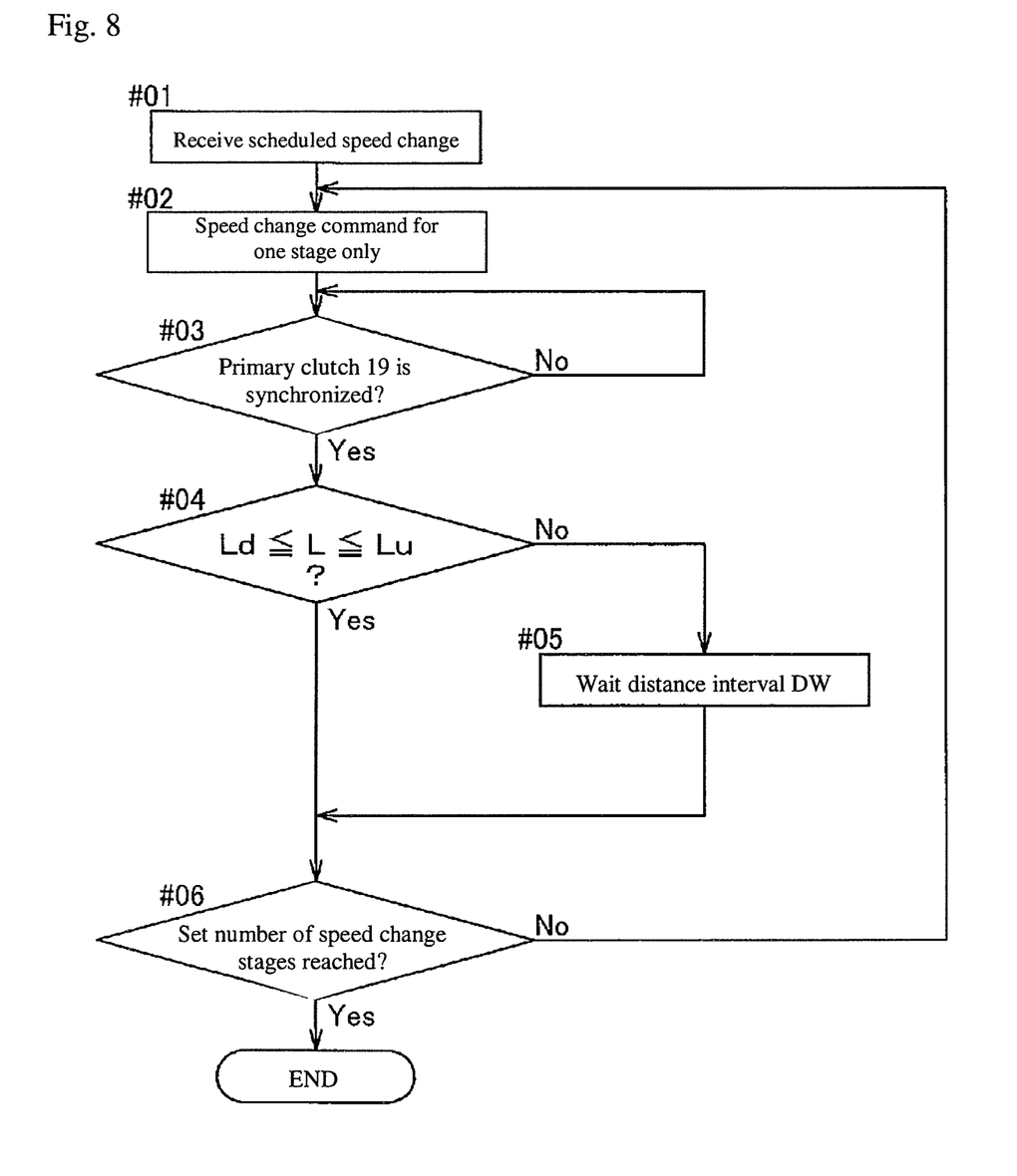
FIG. 8 is a flow chart illustrating a procedural flow of a speed change controller according to another embodiment.
Figure 9:
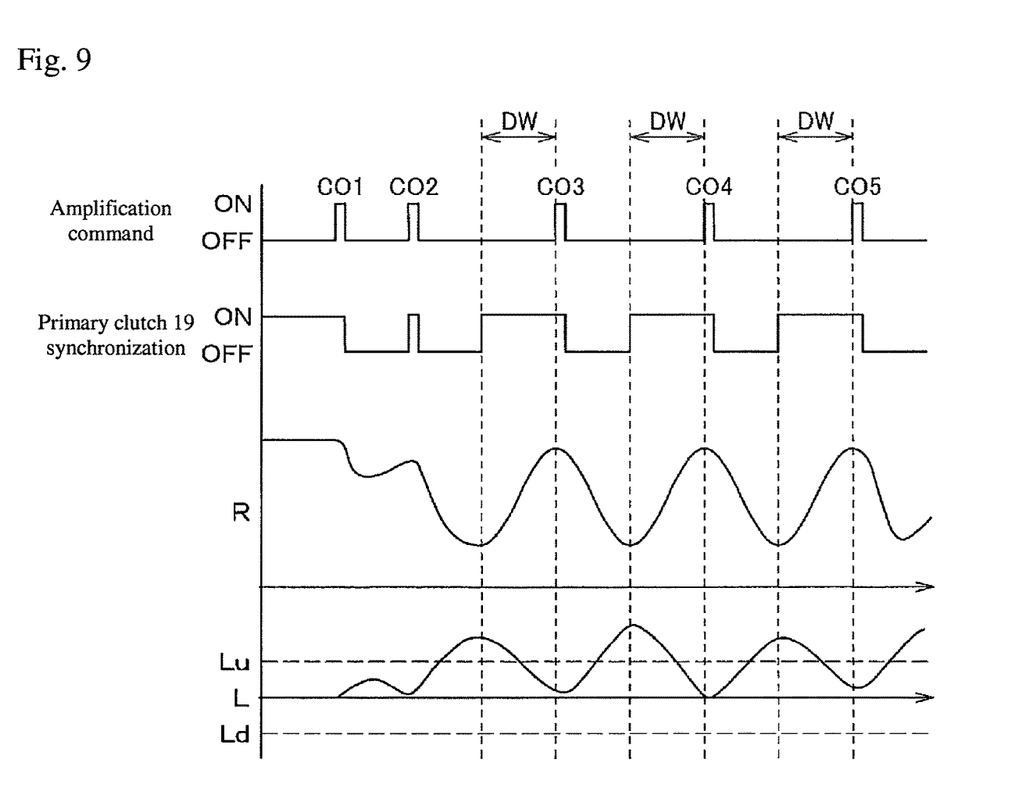
FIG. 9 is a graph illustrating a logic graph of the speed change controller according to the other embodiment.

(1) In the embodiment described above, the speed change interval is configured by the time interval TW, but the present invention is not limited to the embodiment described above. For example, the speed change interval may also be configured by a distance interval DW instead of the time interval TW. As illustrated in FIGS. 8 and 9, when the load factor L is outside the allowable range, the speed change controller 39 may have a configuration in which the vehicle body 3 travels the distance interval DW and then executes the next speed change command. The distance interval DW can be calculated based on the elapsed time and a detected value from the vehicle speed sensor 41. In step #05 of FIG. 8, the time interval TW shown in step #05 of FIG. 4 is swapped out for the distance interval DW, and in FIG. 9 the time interval TW shown in FIG. 5 is swapped out for the distance interval DW. Even with this configuration, stalling of the engine 4 due to a speed increase in the main speed change device 20 is circumvented, and also over-rotation of the engine 4 due to a speed decrease in the main speed change device 20 is circumvented, and the shock that may occur during speed change is alleviated.

The present embodiment is configured so as to enable selecting and switching between the time interval TW and the distance interval DW by operating either one of the distance setting switch 65 and the time setting switch 66 on the numerical value definer 64. When the worker operates the distance setting switch 65, the distance interval DW is displayed in the numerical value display 67, and when the worker operates the time setting switch 66, the time interval TW is displayed in the numerical value display 67. In a state where the distance interval DW is selected as the speed change interval by operating the distance setting switch 65, the number of stages definer 61 is configured so as to be capable of increasing and decreasing the distance interval DW by the worker operating either one of the reducing switch 62 and the increasing switch 63. In addition, the distance interval DW is defined by the speed change interval definer 52 without modification, based on operation by the worker, and the distance interval DW is output to the speed change controller 39. Specifically, the speed change interval can be configured as either the time interval TW or the distance interval DW, and the settings screen 60 (operation mechanism) may be configured so as to enable selection of the time interval TW or the distance interval DW.

Furthermore, a configuration is also possible in which the distance interval DW is defined when the value of the set number of stages 61a increases or decreases due to the worker operating either one of the reducing switch 62 and the increasing switch 63, in a state where the distance interval DW is selected as the speed change interval by operating the distance setting switch 65. Specifically, a configuration is also possible in which the speed change interval definer 52 defines the distance interval DW based on the numerical value of the set number of stages 61a, the target rotation speed of the engine 4, and the load factor L calculated by the load factor calculator 45, and outputs the distance interval DW to the speed change controller 39. Accordingly, the settings screen 60 is configured to enable the distance interval DW (speed change interval) to be adjusted by modifying the value of the distance interval DW and by modifying the set number of stages 61a associated with the distance interval DW.

(2) In the embodiment described above, when the number of defined speed change stages is defined and changes over a plurality of stages due to human operation of the speed change operation tool 44, the speed change controller 39 receives the modification resulting from human operation of the speed change operation tool 44 as a scheduled speed change, and outputs the speed change command by breaking the change down into a plurality of cycles of one stage each. However, the present invention is not limited to the embodiment described above. For example, the speed change controller 39 may also be configured to output the speed change command for two stages at a time or three stages at a time. In other words, when the number of speed change stages is changed over a plurality of stages based on human operation of the speed change operation tool 44, the speed change controller 39 may have a configuration capable of outputting to the main speed change device 20 a speed change command for each predefined number of stages.

(3) The load in the present invention is not limited to the load factor L, and may also be a towing load that the rotary tiller 6 applies to the vehicle body 3. In such a case, the embodiment may be configured such that the tractor is provided with a load detector that can detect a towing load of the rotary tiller 6, and such that the speed change controller 39 is capable of outputting a speed change command at each speed change interval based on either one or both of the load factor L and the towing load.

The embodiment may also be configured to include a load selecting mechanism that is capable of selecting either one of the load factor L and the towing load as the load by way of a human operation. In this case, the load selecting mechanism may be the settings screen 60, or may be various operation tools that are arranged around the driver's seat 13.

(4) The speed change apparatus of the present invention is not limited to the main speed change device 20, and may also be the auxiliary speed change device 21, a speed change device for the rotary tiller 6, or the like. Specifically, the speed change apparatus may have a configuration that changes the speed of drive power that is input from the engine 4 and transmits the drive power to at least one of the travel apparatus and the work apparatus.

(5) The display 51 having the settings screen 60 (operation mechanism) is not limited to a touch screen liquid crystal display installed in the interior of the cabin 10, and may also be a portable terminal, for example. In addition, the operation mechanism that enables adjustment of the speed change interval may also be various kinds of operation tools that are arranged around the driver's seat 13. Specifically, the operation mechanism may have a configuration that enables adjustment of the speed change interval.

(6) In the embodiment described above, the speed change interval definer 52 is configured to define the time interval TW based on the numerical value of the set number of stages 61a, the target rotation speed of the engine 4, and the load factor L calculated by the load factor calculator 45, and to output the time interval TW to the speed change controller 39, but the present invention is not limited to the embodiment described above. For example, the speed change interval definer 52 may also be configured to ignore the numerical value of the set number of stages 61a and define the time interval TW based on the target rotation speed of the engine 4 and the load factor L calculated by the load factor calculator 45, and to output the time interval TW to the speed change controller 39. In addition, the speed change interval definer 52 may also be configured to define the distance interval DW based on the target rotation speed of the engine 4 and the load factor L calculated by the load factor calculator 45, and to output the distance interval DW to the speed change controller 39. Furthermore, a configuration is also possible in which both the time interval TW and the distance interval DW are calculated by the speed change interval definer 52, and the shorter speed change interval of the time interval TW and the distance interval DW is automatically defined as the speed change interval. Specifically, the speed change interval definer 52 may also be configured to be capable of automatically defining the speed change interval.

(7) A configuration is also possible in which either one of the number of stages definer 61 and the numerical value definer 64 are displayed on the settings screen 60. Specifically, the settings screen 60 may be configured to enable the speed change interval to be adjusted by at least one of modifying the value of the speed change interval and modifying the set number of stages 61a associated with the speed change interval.

(8) The speed change controller 39 is configured to output a speed change command at each time interval TW in a case where the load factor L is outside the allowable range. However, the speed change controller 39 may also be configured to output the speed change command for each time interval TW or distance interval DW even when the load factor L is within the allowable range.

(9) The travel apparatuses of the present invention are not limited to the front wheels 1 and the rear wheels 2, and may also be a crawler-style travel apparatus, for example.

(10) The motor of the present invention is not limited to the engine 4, and may also be an electric motor or the like.

(11) The work apparatus of the present invention is not limited to the rotary tiller 6, and may also be a sprayer, for example. Specifically, the work apparatus of the present invention may be an apparatus that performs work on a farm field. Moreover, the present invention may also be configured without a work apparatus. In particular, in a case where the independent weight of the traveling vehicle body is heavy, when the speed of the speed change apparatus is changed by one stage, the engine rotation speed R tends to fluctuate greatly. Therefore, the speed change controller 39 that is capable of outputting a speed change command at each speed change interval is useful even with a configuration not provided with a work apparatus.

(12) The present invention can be applied not only to a tractor, but also to harvesters and sprayers used in farm work, construction equipment used in site preparation, and the like.

The present invention is applicable to any work vehicle having a transmission device.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A work vehicle comprising:
a rotationally driven motor;
a traveling vehicle body on which the motor is mounted;
a travel apparatus that is provided to the traveling vehicle body and is also driven by drive power from the motor;
a drive apparatus that is capable of driving a work apparatus that performs work on a farm field;
a speed change apparatus that receives an input of the drive power of the motor, changes the speed of the input drive power, and transmits the drive power to at least one of the travel apparatus and the work apparatus;

a speed change operation tool that includes a plurality of speed change stages and is also capable of speed change operation of the speed change apparatus by way of a human operation;

a speed change controller that, when the number of speed change stages is changed over a plurality of stages based on human operation of the speed change operation tool, outputs to the speed change apparatus a speed change command for each predefined number of stages and is also capable of outputting the speed change command for each defined speed change interval; and an operation mechanism that enables adjustment of the speed change interval, wherein the speed change interval is an interval in which a speed change of the main speed change device does not occur until a predetermined interval has lapsed.

2. The work vehicle according to claim 1, wherein the speed change interval is a time interval.

3. The work vehicle according to claim 2, wherein the time interval is an interval following completion of the speed change of the speed change apparatus based on the speed change command, and prior to output of the next speed change command.

4. The work vehicle according to claim 1, wherein the speed change interval is configured by a distance interval.

5. The work vehicle according to claim 1, wherein the speed change interval can be either a time interval or a distance interval, and the operation mechanism is configured so as to enable selection of the time interval or the distance interval.

6. The work vehicle according to claim 1, wherein the operation mechanism is configured to enable the speed change interval to be adjusted by at least one of modifying the value of the speed change interval and modifying a set number of stages associated with the speed change interval.

7. The work vehicle according to claim 1, further comprising a speed change interval definer that can automatically define the speed change interval.

8. The work vehicle according to claim 1, further comprising:
a load detector that is capable of detecting a load applied to the motor; and
an allowable load defining mechanism that is capable of defining an allowable range for the load using a human operation,
wherein, in a case where the load is outside the allowable range, the speed change controller outputs the speed change command at each speed change interval.

9. The work vehicle according to claim 8, wherein the load is at least one of a load factor of the motor and a towing load that the work apparatus applies to the traveling vehicle body.

10. The work vehicle according to claim 9 further comprising a load selecting mechanism that is capable of selecting either one of the load factor and the towing load as the load by way of a human operation.

11. A work vehicle comprising:
a motor;
a traveling vehicle body on which the motor is mounted;
a travel apparatus that is provided to the traveling vehicle body and is also driven by drive power from the motor;
a drive apparatus that is capable of driving a work apparatus that performs work on a farm field;
a speed change apparatus that receives an input drive power of the motor, changes a speed of the input drive power, and transmits the drive power to at least one of the travel apparatus and the work apparatus;
a speed change operation device that includes a plurality of speed change stages and is also capable of speed change operation of the speed change apparatus by way of a human operation;
a controller configured to output to the speed change apparatus a speed change command and which takes account of at least one defined speed change interval; and
an operation mechanism that enables adjustment of the speed change interval,
wherein the speed change controller comprises a main controller, an engine controller, and a speed change controller,
wherein the at least one defined speed change interval is determined by an interval in which a speed change of the main speed change device does not occur until a predetermined interval has lapsed.

12. The work vehicle according to claim 11, wherein the main controller sets a target rotation speed of the motor and controls a speed change status.

13. The work vehicle according to claim 11, wherein the engine controller controls operations of the motor based on settings information set by the main controller.

14. The work vehicle according to claim 11, wherein the speed change controller outputs a speed change command based on human operation of the speed change operation device and based on an allowable load defining mechanism that utilizes an allowable range upper limit Lu and an allowable range lower limit Ld.

15. The work vehicle according to claim 11, wherein the speed change interval is a time interval.

16. The work vehicle according to claim 11, wherein the speed change interval is a distance interval.

17. The work vehicle according to claim 11, wherein the main controller outputs information to a display controller and a display is configured to display information from the display controller.

18. The work vehicle according to claim 11, further comprising a rotation speed sensor, a vehicle speed sensor, an acceleration sensor, and a clutch output rotation speed sensor.

19. The work vehicle according to claim 18, wherein the rotation speed sensor detects an engine rotation speed of the motor at an output shaft of the motor, wherein the vehicle speed sensor detects a rotation speed of a rear wheel output shaft, the acceleration sensor detects an operation position of an accelerator pedal, and the clutch output rotation speed sensor detects an output rotation speed of a primary clutch.

20. A work vehicle comprising:
a motor;
a traveling vehicle body on which the motor is mounted;
a travel apparatus that is provided to the traveling vehicle body and is also driven by drive power from the motor;
a drive apparatus that is capable of driving a work apparatus that performs work on a farm field;
a speed change apparatus that receives an input drive power of the motor, changes a speed of the input drive power, and transmits the drive power to at least one of the travel apparatus and the work apparatus;
a speed change operation device that includes a plurality of speed change stages and is also capable of speed change operation of the speed change apparatus by way of a human operation;

a controller configured to output to the speed change apparatus a speed change command and which takes account of plural speed change intervals; and
an operation mechanism that enables adjustment of each of the plural speed change intervals,
wherein the controller comprises a main controller, an engine controller, and a speed change controller,
wherein each of the plural speed change interval is one of a time interval and a distance interval, and
wherein each of the plural speed change interval is determined by an interval in which a speed change of the main speed change device does not occur until a predetermined interval has lapsed.

* * * * *

UNITED STATES PATENT AND TRADEMARK OFFICE
CERTIFICATE OF CORRECTION

PATENT NO. : 11,388,853 B2
APPLICATION NO. : 16/415167
DATED : July 19, 2022
INVENTOR(S) : T. Yamaguchi et al.

It is certified that error appears in the above-identified patent and that said Letters Patent is hereby corrected as shown below:

In the Claims

Column 15, Line 29 (Claim 4) change "is configured by a" to -- is a --

Signed and Sealed this
Seventeenth Day of January, 2023

Katherine Kelly Vidal
*Director of the United States Patent and Trademark Office*